United States Patent [19]
Holtkamp

[11] 3,916,625
[45] Nov. 4, 1975

[54] HYDROSTATIC PROPULSION SYSTEM
[75] Inventor: Donald A. Holtkamp, Battle Creek, Mich.
[73] Assignee: Clark Equipment Company, Buchanan, Mich.
[22] Filed: Sept. 23, 1974
[21] Appl. No.: 508,587

[52] U.S. Cl. ............... 60/421; 60/445; 60/486; 180/44 F; 60/427
[51] Int. Cl.² .......................................... F16H 39/46
[58] Field of Search ............ 60/375, 421, 427, 428, 60/445, 486; 180/6.48, 44 F, 66 F, 66 R

[56] References Cited
UNITED STATES PATENTS

| | | | |
|---|---|---|---|
| 3,091,930 | 6/1963 | Thoma et al. | 180/66 R X |
| 3,161,246 | 12/1964 | Meeker et al. | 180/6.48 |
| 3,422,917 | 1/1969 | Guinot | 180/66 R |
| 3,583,512 | 6/1971 | Praddaude | 60/427 X |
| 3,841,423 | 10/1974 | Holtkamp et al. | 180/66 R |

Primary Examiner—Edgar W. Geoghegan
Attorney, Agent, or Firm—John C. Wiessler

[57] ABSTRACT

A closed recirculating hydrostatic transmission system suitable for driving a traction vehicle. The system includes a pair of hydrostatic engine driven variable displacement pumps either of different displacements or engine driven at different speed ratios and each pump being operative to drive hydrostatic motors at the various wheels and in separate closed loop drive circuits such that accurate flow division as between the circuits is effected for driving the vehicle in four-wheel drive or, at the operator's selection, for driving the motors in the one closed loop circuit at a higher speed in two-wheel drive by means of the pump of larger discharge volume. An operator's control operates both pumps together with the limits of the smaller discharge pump in four-wheel drive, and operates the larger discharge pump within the limits thereof while rendering ineffective the smaller discharge pump in two-wheel drive. The operator's control includes a magnetizable linkage which, at the operator's election, may function as a rigid link to operate both pumps together or as a collapsible or expansible link which may operate the larger pump within its limits of displacement while returning the smaller pump to zero displacement. Valve means enables smooth transition and shifting between two and four-wheel drive at any time. Flow divider-combiner means in each closed loop circuit adjusts fluid flow to each motor as a function of steering angle to assure positive traction at each driven wheel in either forward or reverse drive under all surface conditions, and to differentiate, as required, wheel speeds during vehicle steering operations.

13 Claims, 7 Drawing Figures

HYDROSTATIC PROPULSION SYSTEM

BACKGROUND OF THE INVENTION

This invention provides an alternative structure to that disclosed in the copending application Ser. No. 508,588, filed concurrently herewith in the names of W. L. Chichester and the applicant hereof, common assignee.

SUMMARY

The present invention concerns a traction drive hydrostatic transmission system similar in all respects to the invention of the above identified co-pending application, except that the operator's control device is of a substantially different type operating on a magnetic-mechanical principal as distinguished from the straight mechanical control means of the other application.

A pair of independent closed loop circuits are activated by a pair of engine driven variable displacement reversible fluid pumps, one of which has a larger volume discharge capability than the other for driving the vehicle at selected speeds and torque in forward and reverse drive, under which conditions the vehicle is in four-wheel drive and control means limits the displacement of the larger fluid volume pump to the maximum displacement of the smaller fluid volume pump. The control means is also operable to select two-wheel drive in which the smaller volume pump is returned to a zero displacement condition while the larger volume pump may operate up to its maximum discharge capability.

DESCRIPTION OF THE PREFERRED EMBODIMENT

Figure 1:
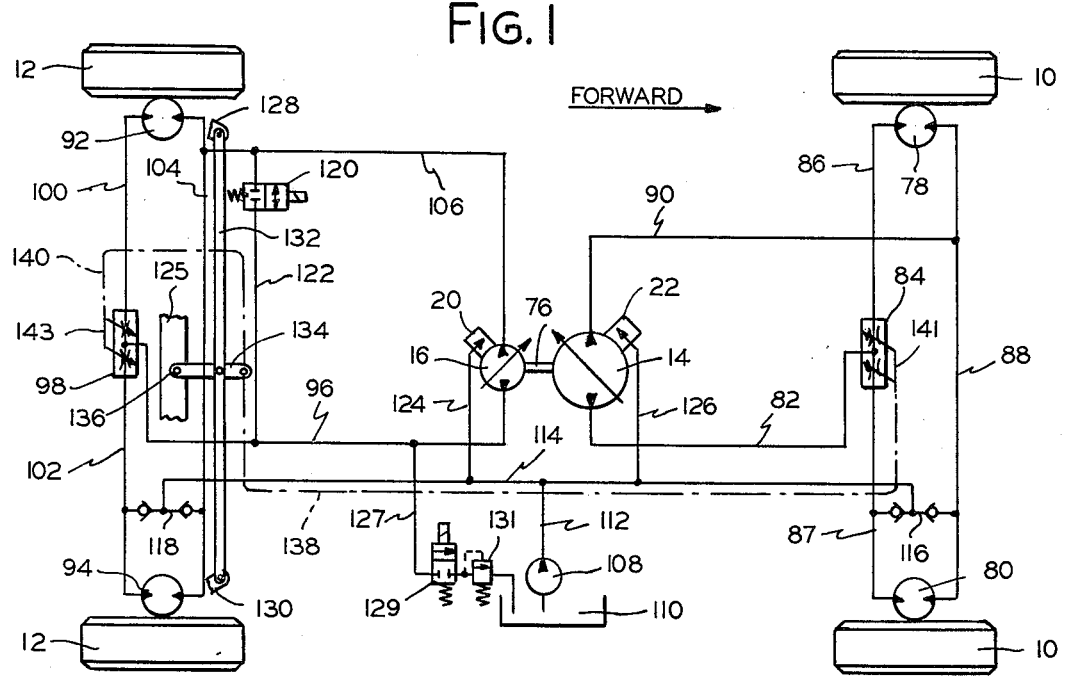
FIG. 1 is a schematic view of my hydrostatic transmission system in a vehicle.
Figure 2:
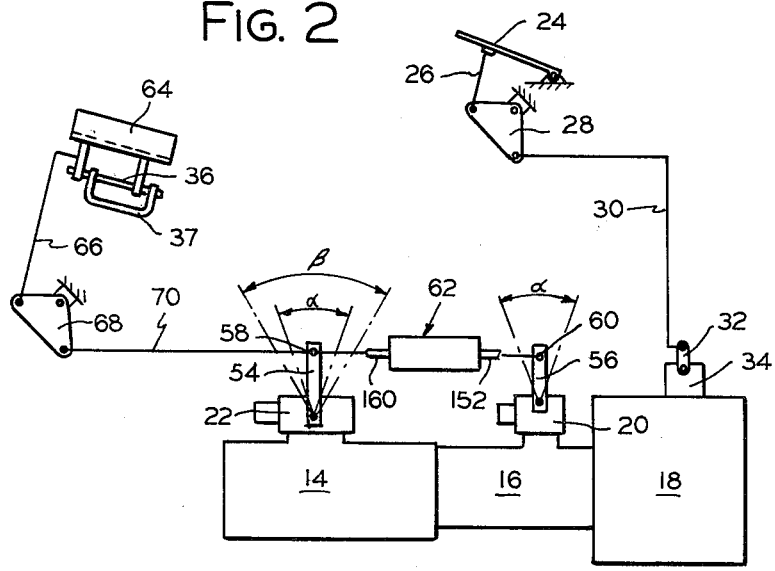
FIG. 2 is a schematic view of the controls for the transmission system of FIG. 1.

Referring now in detail to FIGS. 1–5, a vehicle is represented by front and rear pairs of wheels 10 and 12 adapted to be driven by my hydrostatic transmission system which includes a pair of operator controlled reversible variable displacement pumps 14 and 16 of different capacities driven by an engine 18 coupled thereto, the control section of the pumps for varying the displacement via control of the camming or swash plate angles being represented at numerals 20 and 22. An accelerator pedal 24 may be connected by push-pull cables and levers 26, 28, 30 and 32 to control the engine via a carburetor 34. The pump control sections 20 and 22 are manually controlled by the operator via the controls shown in FIGS. 2–5.

Figure 5:
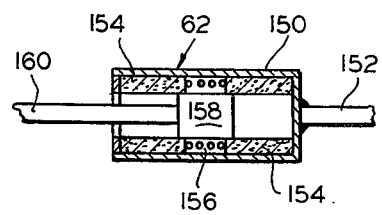
FIG. 5 is an enlarged view in section of a component magnetic link element in the control of FIG. 2.
Figure 3:
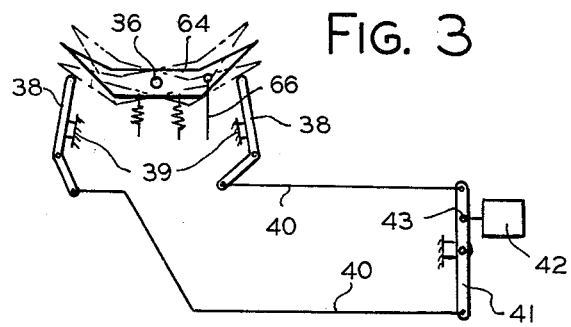
FIG. 3 is a detailed front view in one operating position of the control for the operator's pedal control shown in FIG. 2.
Figure 4:
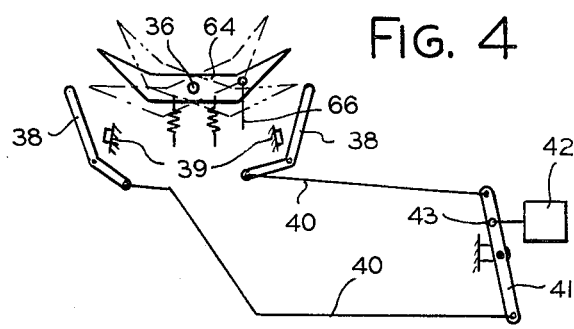
FIG. 4 shows a second operating position of the control of FIG. 3.

Pump displacement via control sections 20 and 22 is effected by actuating in one direction or the other forward or reverse vehicle drive the pump control levers 54 and 56 which are connected at pivot points 58 and 60 via a novel link assembly of my invention shown generally at 62 and in detail in FIG. 5. The pump controls 54 and 56 are connected to a forward and reverse operator's foot pedal control 64 via push-pull rod, lever and link assemblies 66, 68 and 70, link 70 being also connected pivotally at 58 to control lever 54. Pedal control 64 is pivoted at 36 to a bracket 37 with push-pull rod 66 mounted on one side of the pedal as shown so that actuation thereof in one direction effects a push or downward movement of rod 66 to actuate pump levers 54 and 56 in one direction to displace pumps 20 and 22 for forward operation of the vehicle; actuation of pedal 64 in an opposite direction pulls rod 66 upwardly to displace the pumps for reverse operation of the vehicle. A pair of centering springs may be located as shown on opposite sides of pedal pivot 36 tending to maintain the pedal in neutral or zero displacement position. A pair of levers 38 are mounted as shown in FIG. 3 in contact with a pair of stop members 39, the levers being actuatable by push-pull rod 40, a lever 41 and an operator controlled double-acting solenoid actuator 42 which is connected to lever 41 at 43 above the central pivot. Retraction of solenoid 42 causes levers 38 to be actuated into contact with stops 39 and extension of the solenoid effects on opposite actuation outwardly of levers 38 such that the upper ends of levers 38 clear the opposite outer ends of pedal 64 as shown in FIG. 4 which may then be actuated against one spring or the other a greater distance in either direction than is permitted when levers 38 are located as in FIG. 3. The available movements of pedal 64 under the above varied conditions are indicated by the dotted line positions thereof in FIGS. 3 and 4. The purpose of the above control is to limit the displacement of pumps 14 and 16 in four-wheel drive operation by limiting the available travel rod 70 to the available pivotal movement of pedal 64 between stops 39 as shown in FIG. 3, thereby to limit the maximum angular movement in both forward and reverse of pump control levers 54 and 56. In two-wheel drive, on the other hand, as will be described further below, levers 38 are actuated out of interfering relation with pedal 64 so that rod 70 may be actuated a greater distance than previously to increase the displacement of pump 14 while pump 16 is returned to a non-pumping condition by a spring return in pump control 20.

Pumps 14 and 16 differ in displacement, and for exemplary purposes it will be assumed herein that pump 14 has a displacement twice of that pump 16, although it should be understood that any other ratio of displacement between the pumps is a matter of design choice depending upon the application of my invention. The pumps are engine driven by a single common drive shaft 76 to operate always together at the same rpm. Pump 14 is connected hydraulically in forward drive to a pair of fixed displacement front wheel motors 78 and 80 by a porportional flow divider-combiner unit 84, conduits 86 and 87 conveying pump discharge to the motors and return conduits 88 and 90 returning the fluid flowing in the closed loop circuit of pump 14 to the inlet of the pump. Operating pump 14 in reverse by means of the controls of FIG. 2 reverses the above flow route in which conduit 90 becomes the pressure discharge conduit, the fluid returning to the then pump inlet through conduit 82, in which condition unit 84 functions as an adjustable flow combiner. Pump 16 is connected similarly hydraulically for both forward and reverse drive to a pair of fixed displacement rear wheel motors 92 and 94 by way of conduit 96, a proportional flow divider-combiner unit 98, and conduits 100, 102, 104 and 106.

Make-up fluid in the system is provided by a charging pump 108 which is connected to a reservoir 110 and the opposite closed loop circuits connecting pairs of motors 78, 80 and 92, 94 by conduits 112 and 114 and low pressure one-way check valve sets 116 and 118 which connect opposite sides of the circuit loops of the pairs of wheel motors, as shown. The make-up and control circuit also communicates with pump control sections 20 and 22 by way of lines 124 and 126 in order to supply pressure fluid to a conventional servo valve and power boost piston in each pump which actuates the respective swash plates as controlled by control pump levers 54 and 56.

In addition, a solenoid actuated on-off valve 120 is adapted to communicate conduit 106 with reservoir 110 by way of conduits 122, 96 and 127 under conditions to be described. A solenoid actuated two-position valve 129 is a part of a fluid cooling circuit located in conduit 127 which is operative under certain conditions to return a limited amount of fluid which circulates through motors 92 and 94 when wheels 12 are not in traction drive to reservoir 110 by way of a pressure compensated flow control valve 131 which functions to permit a predetermined volume of fluid flow therethrough to reservoir 110 irrespective of variations in the upstream fluid pressure. As will be described further hereinbelow, valves 120 and 129 are operated simultaneously so that in four wheel traction drive both valves are closed, as shown, and in two wheel drive with wheels 12 free-wheeling both said valves are actuated open.

To improve the clarity of this description, we have not shown certain important but well-known sub-circuits herein which are not necessary to an understanding of my invention, such as pump relief valve circuits and fluid leakage circuits for connecting the wheel motors and pumps to the reservoir. Also, it will ordinarily be found desirable to provide a fluid make-up circuit connected by one-way check valves to the opposite sides of each of pumps 14 and 16 and supplied by charging pump 108 adapted to communicate with the inlet and discharge lines of each pump, respectively, depending upon forward or reverse operation thereof.

Steering of the vehicle is effected by a conventional operator power steering device for actuating dirigible wheels 12, which are mounted on a steer axle 125. Steering arms 128 and 130 are pivotally connected to a tie rod 132 which is connected pivotally at its center to a lever arm 134 pivoted on the steer axle at 136 and connected to push-pull cables represented by the broken lines 138 and 140 which are connected to controls 141 and 143 of flow divider-combiner units 84 and 98 for dividing the fluid flowing to or from the respective pairs of drive wheel motors proportional to the steer angle of wheels 12, as described further below.

The functioning generally of the controls of FIGS. 2–5 in relationship to the pump control levers 54 and 56 have been described above except in respect to the link assembly 62, which is connected to pump lever 56 by an outer cylinder housing 150 and a rod 152 secured as by welding thereto. Centrally located within the cylinder between a pair of cylindrical non-magnetic bearing liner elements 154, such as Teflon or bronze, is an electric coil 156 suitably connected to the operator controlled switch device which also activates solenoid actuator 42. A permanent magnet 158 is secured to the end of a rod 160 of non-magnetic material which is in turn pivotally connected to pump lever 54 at 58 for actuation by pedal 64 in either direction in cylinder 150.

When the coil 156 is not energized it is magnetized by magnet 158 thereby forming a fixed link between rods 152 and 160 so that upon actuation of control pedal 64 pump levers 54 and 56 are synchronized in their movements in both directions. Operator activation of solenoid 42 to actuate levers 38 also energizes coil 156 thereby demagnetizing the central area in which the coil is located in cylinder 150 which permits the magnet 158 to be actuated in either direction by rod 160 in cylinder 150 while the cylinder remains in a fixed neutral position. Thus, with coil 156 not energized and solenoid 42 not activated, actuation of pedal 64 to push or pull rod 66 is limited by levers 38 abutting stops 39, under which condition the magnetized rigid link assembly 62 as actuated by link rod 70 synchronizes the movement of the pump displacement control lever 56 with the movement of lever 54 within the limits of movement of lever 56 in forward and reverse four-wheel drive. Under such selected conditions of operation with the limits of pump displacement of both pumps limited by the capacity of the small pump, the angle $\alpha$ shown between the two pairs of broken lines at the pump levers illustrate such limit of displacement. Activation of solenoid 42 and energization of coil 156 as aforesaid enables pedal 64 to be actuated fully in either direction for two-wheel drive and enables link rod 70 to actuate pump lever 58 in forward or reverse drive through the angle $\beta$ while cylinder 150 and rod 152 are maintained in a fixed position with pump lever 58 at zero pump displacement.

In operation, with the system in four-wheel drive, the pumps 14 and 18 each displace the same volume of fluid at any selected operating condition within the limits of engine speed and movement of control rod 70 in both forward and reverse drive through the respective and independent closed loop circuits of FIG. 1. Valves 120 and 129 are, of course, closed under such condtions, and positive traction drive is assured at all four wheels regardless of variations in surface tractive conditions as between any two or more wheels.

During vehicle turning manuevers positive traction at each wheel and correct wheel speed differentiation as a function of the steering angle of dirigible wheels 12 is effected by the operation of flow divider-combiner units 84 and 98 as controlled by lever 134. In other words, the push-pull cables 139 and 140 control units 84 and 98 to divide or combine in forward or reverse drive the correct proportion of fluid flowing as between each of the front and rear pairs of wheel motors such that correct differentiation of the rotational speeds of wheel sets 10 and 12 is realized at all steering angles, the outside wheels being driven in traction to rotate at speeds greater than the driven inside wheels in amounts always proportional to the steering angle of wheels 12. Further, the flow divider-combiner units are so designed as to maintain at either restrictor section thereof the same differential pressure causing flow through that section regardless of possible variations in pressure downstream in line 86 or 87 in the forward loop circuit and in lines 100 and 102 in the rear loop circuit at any adjusted setting of the divider-combiner units by cables 138 and 140, thus eliminating the possibility of loss of traction at any wheel for any reason. An exemplary divider-combiner unit which performs as above indicated is Model 2VXP 1420 Series manufactured by Fluid Controls, Inc., Mentor, Ohio.

During a shift from four to two-wheel drive it is highly advantageous to provide a transient condition of operation in which the output of pump 16 is bypassed back to the inlet of pump 16 and to permit a limited volume to flow to the reservoir; i.e., at the time of activation of solenoid 42 and coil 156, at which time pump 14 may be operating at any displacement within the limit of displacement of pump 16. Thus, with both valves 120 and 129 open to pump inlet and to the reservoir through the pressure compensated flow control valve 131 it is apparent that no pressure surges in the system can occur and pump 14 continues to drive wheel motors 78 and 80 at the displacement existing at the time of shifting from four to two-wheel drive, thereby effecting maintenance of vehicle speed substantially the same as in four-wheel drive, but with one-half of the system fluid circulating at that time not being utilized. Thus, the system is conditioned for subsequent two-wheel drive at full speed by the transient condition of two-wheel drive at one-half or less of maximum vehicle speed. Likewise, a smooth transition from two to four-wheel drive is effected at any engine speed inasmuch as the displacement of pump 14 must be such that a reverse activation of double acting solenoid 42 is capable of actuating levers 38 beneath the wings of control pedal 64, which also, of course, inherently requires that the permanent magnet 158 be located in such a position in cylinder 150 that the displacement to be imposed upon pump lever 56 during such shifting is within the limits of displacement of pump 16. It will be understood that pump 16 is already operating via shaft 76 at existing engine speed at the time lever 56 is actuated out of a neutral position. The use of such an operational transition in shifting between two and four-wheel drive and vice versa while the vehicle is being driven at any selected speed has been found to be essential in order to control and minimize shock pressure loading in the system and jerky operation of the vehicle.

It will be noted that in two-wheel drive, valves 129 and 131 open to return a predetermined volume of fluid circulating through motors 92 and 94 to the reservoir since otherwise the fluid circulating in the closed parallel circuit during free-wheeling of wheels 12 will generate too high a temperature in the hydraulic circuit of motors 92, 94. When the vehicle is operated in reverse drive a reverse flow in the circuit occurs with the valves 120, 129 and 131 functioning the same as in forward drive, both in four and two-wheel drive.

Figure 6:
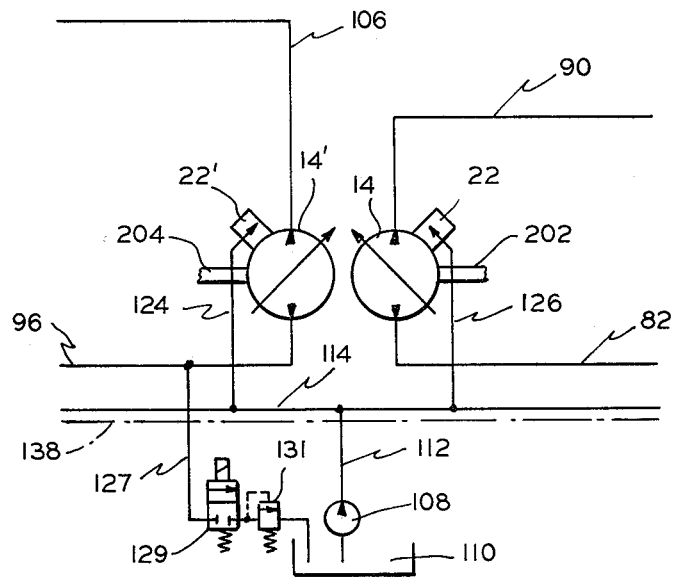
FIG. 6 is a broken partial view of FIG. 1 showing a modified pump arrangement.
Figure 7:
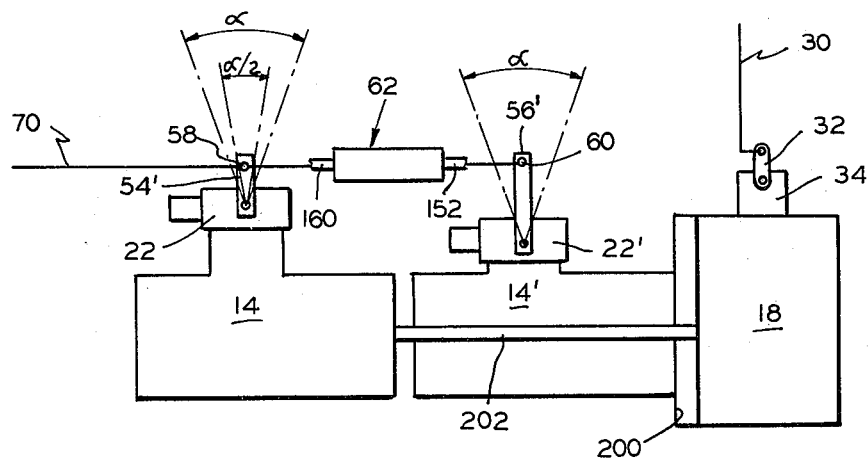
FIG. 7 is a partial view of the controls of FIG. 2 modified for the FIG. 7 embodiment.

Referring now to FIGS. 6 and 7, we have illustrated a modification in which the variable displacement pumps are of equal maximum displacement, illustrated as pumps 14 and 14', with pump 14 being assumed to operate at a 2:1 speed ratio relative to pump 14' as effected through a gear reduction illustrated diagrammatically at numeral 200 on engine 18, said pumps being connected thereto by separate drive shafts 202 and 204. In this exemplary modification the effective length of pump control lever 54' is one-half the length of control lever 56'. However features of the embodiment illustrated in FIGS. 1–5 may be the same in the embodiment of FIGS. 6 and 7, and as illustrated at the prime numerals 22 and 22' and 56', the pump control sections 22 and 22' being then same as control section 22 and 20 and the control lever 56' being twice the effective length of lever 54'. The other parts of the system shown in FIG. 6 and 7 have been numbered the same as in FIGS. 1 and 2. Thus, it will be seen that the operational result of the modified embodiment is the same as in that of FIGS. 1–5 in the use of pumps of the same maximum displacement with the pump having the greater discharge capacity being operated at twice the rpm of the other pump with one-half the pump displacement, illustrated as effected by a one-half length ratio between control levers 54' and 56', the pump 14 having one-half the displacement of pump 14' but equal discharge flow in forward wheel drive (represented by the displacement angle designations $\alpha$ and $\alpha/Z$), and in two-wheel drive pump 14 doubling its discharge flow at displacement angle $\alpha$ while pump 14' is returned to a zero displacement condition.

Of course, it will also be understood that any desired combination of pump sizes, relative speed ratios, pump control lever length, and the like, are matters of design choice depending upon the particular application, costs, space, availability, and all other such factors as are considered by the design engineer, all such variations being well within the scope of my invention.

It will be understood that terms in the claims hereof such as "fluid discharge capability" and "pumping capacity" are related to operation of the system under any given operating condition, such as any given engine speed.

Although I have described and illustrated only two embodiments of my invention, in addition to discussing other obvious variations thereof, it will be understood by persons skilled in the art that many other modifications may be made in the structure, form and relative arrangement of parts without departing from the spirit and the scope of the invention. It is obvious, for example, that the hydrostatic drive system of the basic type herein disclosed is readily modifiable and applicable within the scope of the invention to a three-wheel vehicle wherein, for example, the third wheel may be drive-steer wheel. U.S. Pat. No. 3,376,990 discloses a three-wheel vehicle having two front wheel drive and one rear wheel steer; the present invention has application to such a modified vehicle, as well as, of course, vehicles using any number of wheels greater than three.

Likewise, as will be apparent, the invention is applicable to endless track vehicles, drive elements of which may be of various shapes other than a wheel shape, and so equivalent between wheels and other shapes performing a similar function as wheels is intended by applicant. For example, an endless track vehicle having a generally square-shaped driving element M as shown in U.S. Pat. No. 3,531,165.

It is clear that different diameter wheels may be utilized as between first and second pairs of wheels in a given vehicle, for example, and while we have illustrated pairs of wheels 10 and 12 of equal diameter they may be of any selected different diameters, the important factor in equal traction drive as between the wheels being that the wheels traverse substantially the same circumferential distance in the same period of time irrespective of variations in surface or road traction as between surface or road engaging elements of any of said wheels, the volume distribution of hydraulic fluid to the pairs of motors being a function of the respective wheel diameters.

Accordingly, it should be understood that I intend to cover by the appended claims all such modifications which fall within the scope of my invention.

I claim:

1. In a hydrostatic drive system for a vehicle having first and second traction means, first and second hydraulic motor means for driving respective ones of said traction means and a prime mover means, first and second variable displacement hydraulic pump means driven by the prime mover means for driving the first and second motor means, respectively, said first pump means having a fluid discharge capability greater than said second pump means, and means controlling the fluid discharge of said first and second pump means including magnetic link means and means limiting the fluid discharge of said first pump means substantially to the fluid discharge of said second pump means in a first vehicle operating condition.

2. A vehicle drive system as claimed in claim 1 wherein said first and second pump means are operated at the same rpm, each pump means driving its respective motor means in a closed loop.

3. A vehicle drive system as claimed in claim 1 wherein said first and second pump means are operated at different rpm's, each pump means driving its respective motor means in a closed loop.

4. A vehicle drive system as claimed in claim 1 wherein in a second operating condition said magnetic link means is demagnetized to permit said first pump means to operate at said greater fluid discharge and to permit said second pump means to operate at substantially zero fluid discharge.

5. A vehicle drive system as claimed in claim 4 wherein said first operating condition comprises driving said first and second motor means and said second operating condition comprises driving said first only of said motor means.

6. A vehicle drive system as claimed in claim 1 wherein said prime mover means drives said first and second pump means, each of said pump means operating with its respective motor means in a closed loop, and steering control means in each closed loop operable to effect differential wheel speed under traction as between each of two pairs of wheels driven by said first and second motor means.

7. A hydrostatic drive system for a vehicle having first and second traction means, first and second hydraulic motor means for driving respective ones of said traction means and a prime mover means, first and second variable displacement hydraulic pump means driven by the prime mover means for driving the first and second means, respectively, said first pump means having a fluid discharge capability greater than said second pump means, and control means operatively connected to said first and second pump means for operating said second pump means at substantially zero fluid discharge when said first pump means is operating at said greater fluid discharge, said control means including a link means and means for demagnetizing said link means.

8. A vehicle drive system as claimed in claim 7 wherein said control means operates to communicate in parallel the circuit of said second pump means and second motor means when said first pump means is operating at said greater fluid discharge.

9. A hydrostatic drive system for a vehicle having first and second traction means, first and second hydraulic motor means for driving respective ones of said traction means and a prime mover means, first and second variable displacement hydraulic pump means driven by the prime mover means for driving the first and second motor means, respectively, said first pump means having a fluid discharge capability greater than said second pump means, a control means connected to both said first and second pump means for maintaining under first operating conditions substantially equal fluid discharges thereof during operation within a fluid discharge capability limited by said second pump means and under second operating conditions enabling said first pump means to be operated at a fluid discharge greater than the fluid discharge capability of said second pump means, said control means including link means magnetizable and demagnetizable at the operator's election to enable operation at said first or second operation condition.

10. A vehicle system as claimed in claim 9 wherein said link means when magnetized functions as a rigid link connected to both said first and second pump means and when demagnetized functions as a collapsible link enabling the first pump means to be operated at a fluid discharge greater than the fluid discharge capability of said second pump means.

11. A vehicle drive system as claimed in claim 9 wherein said control means also includes an operator's control operatively connected to said first and second pump means by said link means, and means coordinated with said link means for limiting the range of control of said operator control means to a first range in said first operating condition and for limiting the range of control thereof to a second range in said second operating condition.

12. A vehicle drive system as claimed in claim 9 wherein said link means includes a cylindrical member operatively connected to one of said pump means, a permanent magnet movable axially of said cylindrical member operatively connected to the other pump means, and electrical means for demagnetizing said permanent magnet.

13. A vehicle drive system as claimed in claim 12 wherein said electrical means is de-energized to effect said first opening condition and is electrically energized to effect said second operating condition.

* * * * *